United States Patent [19]

Campbell

[11] 4,177,118

[45] Dec. 4, 1979

[54] PROCESS FOR ELECTROLYZING WATER

[75] Inventor: Barrie C. Campbell, Payson, Utah

[73] Assignee: Billings Energy Corporation, Provo, Utah

[21] Appl. No.: 845,319

[22] Filed: Oct. 25, 1977

Related U.S. Application Data

[63] Continuation-in-part of Ser. No. 661,788, Feb. 26, 1976, Pat. No. 4,056,452, and a continuation-in-part of Ser. No. 661,789, Feb. 26, 1976, Pat. No. 4,057,479.

[51] Int. Cl.$^2$ ............................................... C25B 1/10
[52] U.S. Cl. ................................................... 204/129
[58] Field of Search ................................. 204/129, 57

[56] References Cited

U.S. PATENT DOCUMENTS

| | | | |
|---|---|---|---|
| 900,502 | 10/1908 | Ferchland et al. | 204/57 |
| 2,846,378 | 8/1958 | Hoffmann | 204/57 |
| 2,859,166 | 11/1958 | Grigger | 204/57 |
| 3,379,634 | 4/1968 | Rutkowski | 204/129 |
| 3,933,614 | 1/1976 | Bunn | 204/129 |
| 4,039,409 | 8/1977 | La Conti et al. | 204/129 |
| 4,056,452 | 11/1977 | Campbell | 204/258 |
| 4,057,479 | 11/1977 | Campbell | 204/258 |

*Primary Examiner*—R. L. Andrews
*Attorney, Agent, or Firm*—Criddle, Thorpe & Western

[57] ABSTRACT

Electrolysis of water is accomplished by positioning a lead dioxide anode and a cathode in spaced relationship to each other, with an electrically conducting medium maintained in contact with the anode and cathode to provide a conduction path therebetween. An electric current is then passed through the conducting medium from the anode to the cathode, thereby generating hydrogen gas at the cathode.

6 Claims, No Drawings

PROCESS FOR ELECTROLYZING WATER

BACKGROUND OF THE INVENTION

1. Related Applications

This application is a continuation-in-part of my copending applications U.S. Ser. Nos. 661,788, and 661,789 which were both filed on Feb. 26, 1976 and have issued as U.S. Pat. Nos. 4,056,452 and 4,057,479, respectively.

2. Field

The invention pertains to electrolysis and, in particular to the electrolysis of water to form hydrogen and oxygen.

3. State of the Art

Industrial cells are commercially available for various electrolytic processes. In the production of sodium and chlorine from molten salt, the cells commonly employ lead dioxide anodes; however, neither hydrogen nor oxygen is produced in such cells. Lead dioxide is also commonly employed as the anode in the commercial lead acid battery, wherein the lead dioxide is chemically decomposed and then reformed as the battery discharges and changes, respectively.

Electrolytic cells for electrolyzing water have typically included a container for holding an acidic or alkaline electrolyte, with a pair of electrodes immersed in the electrolyte. Application of direct current across the electrodes produces an electrochemical reaction at the electrodes so that oxygen is produced at the anode and hydrogen is produced at the cathode. As reported in "A Hydrogen-Energy System" by the American Gas Association, 1973, the electrodes in water electrolyzers commonly consist of flat sheets of mild steel, with the anodes being heavily nickel-plated. Alternatively, anodes comprising a precious metal or precious metal alloy have been suggested to improve the efficiency of the cell. The use of a lead dioxide anode in an electrolysis cell for the generation of hydrogen and oxygen has never, within the knowledge of the present inventor, been suggested.

4. Objective

The primary objective of this invention was to develop a process for the electrolysis of water wherein the anode comprises an inexpensive material in comparison to the nickel-plated and precious metal anodes used in prior art processes.

SUMMARY OF INVENTION

In accordance with the invention, electrolysis of water to generate hydrogen is achieved by positioning at least one lead dioxide anode and at least one cathode in spaced relationship to each other. An electrically conducting medium is provided in contact with the anodes and cathodes to provide a conduction path through the conducting medium. The surfaces of the anodes and cathodes in contact with the conducting medium are wetted with water, and an electric current is then passed through the conducting medium from the anodes to adjacent cathodes thereby generating hydrogen gas at the cathodes and oxygen at the anodes.

In a preferred emodiment of the invention, the anode comprises a base metal substrate onto which lead dioxide is deposited so that the portion of the anode which is in contact with the electrolyte medium is substantially completely encased with lead dioxide. Advantageously, the lead dioxide is electroplated onto the base metal substrate.

The electrodes can either be immersed in an aqueous alkaline or acidic electrolyte solution or they can be disposed in spaced relationship to each other, with a solid polymer electrolyte membrane positioned therebetween. When the electrodes are immersed in the electrolyte, current is carried by the various ions in the electrolyte, and water in the electrolyte is decomposed to hydrogen and oxygen at the respective electrodes. In the system using the solid polymer electrolyte membrane, the anode and cathode are held in spaced relationship to each other with the membrane positioned therebetween and means are provided for wetting the surfaces of the electrodes which abut the membrane with water. Current is conducted from the anode to the cathode by the solid polymer electrolyte, and the water on the surfaces of the respective electrodes is decomposed to hydrogen and oxygen. Wetting of the electrodes with water is achieved by flowing water between the electrodes and the membrane. To assist in this flow of water, the electrodes can be formed with grooves in their surfaces which abut the membrane or, alternatively, the electrodes can be formed in a sintered or otherwise porous condition so that water can flow therethrough.

DETAILED DESCRIPTION OF THE PREFERRED EMBODIMENTS

In accordance with the present invention, water is electrolyzed to form hydrogen and oxygen using a process in which the anode or anodes in the electrolysis cell are made of inexpensive lead dioxide and the cathode or cathodes are made of a metal such as iron or mild steel. The electrolysis cell is arranged with the anodes and cathodes in spaced relationship, and an electrically conducting medium is provided in contact with the electrodes to provide conduction paths between adjacent anodes and cathodes. The faces of the electrodes are wetted with water, and an electric current is passed through the conducting medium from the anodes to adjacent cathodes generating hydrogen gas at the cathodes and oxygen gas at the anodes.

Commercial electrolysis cells of the so called "tank-type" electrolyzers comprise large vats containing an aqueous electrolyte in which a plurality of electrodes of alternate polarity are suspended. Such cells are well adapted for the process of the present invention. In accordance with the invention, a plurality of lead dioxide anodes are interleaved with iron or mild steel cathodes, and the electrodes are immersed in the aqueous electrolyte. The electrolyte can be either acidic or alkaline, inasmuch as the lead dioxide anodes of this invention are equally resistant to corrosion in either acidic or alkaline electrolytes. A voltage of about 2 volts is applied across the anodes and cathodes. Multiple tanks can be arranged in series to raise the voltage of the system. The anodes can be formed of solid lead dioxide, or, preferably, made of a base metal material upon which lead dioxide has been deposited so as to substantially encase at least that portion of the anodes which is immersed in the electrolyte. Advantageously, the lead dioxide is electroplated onto the base metal substrate.

The present process can also be employed with recently developed technology involving the use of solid polymer electrolytes in place of the conventional aqueous electrolytes. A description of the solid polymer electrolytes is given in my copending applications Ser.

No. 661,788 and Ser. No. 661,789 which have issued as U.S. Pat. Nos. 4,056,452 and 4,057,479, respectively. Briefly, solid polymer electrolytes are polymeric materials which when saturated with water, become excellent ionic conductors. In cells utilizing such materials, an anode and cathode are positioned on either side of and abutting against a sheet of membrane of the solid polymeric material. In accordance with the present invention, an anode comprising solid lead dioxide or a base metal onto which lead dioxide has been coated is positioned abutting one side of the solid polymer electrolyte membrane and a metal cathode is positioned abutting the other side of the electrolyte membrane. The surfaces of the anode and cathode abutting the electrolyte membrane are wetted with water, and an electric current is passed through the membrane from the anode to the cathode thereby generating hydrogen gas at the cathode and oxygen gas at the anode.

The reaction mechanism which is believed to occur in the cells employing a solid polymer elctrolyte membrane which conducts current by movement of hydrogen ions therethrough involves ionization of water at the anode, thereby producing gaseous oxygen and hydrogen ions is solution. The hydrogen ions move freely through the solid polymer membrane to the cathode where they form into gaseous hydrogen. When the solid polymer electrolyte membrane is of the type which conducts current by the movement of hydroxide ions therethrough, water is decomposed at the cathode to gaseous hydrogen and hydroxide ions in solution. The hydroxide ions move through the membrane to the anode where they form into gaseous oxygen.

The surfaces of the electrodes abutting the solid polymer membranes can be maintained in a wetted condition by using porous electrodes through which water is supplied to the interface between the electrodes and the membranes. Porous electrodes are conveniently made from sintered materials. In U.S. Pat. No. 4,045,303 a method is disclosed for electroplating porous substrates, and a porous lead dioxide anode useful for the purposes of this invention can be made by electroplating lead dioxide upon a porous substrate in accordance with the teachings of that patent.

The surfaces of the electrodes abutting the solid polymer membranes can also be maintained in a wetted condition by providing a series of grooves in those surfaces. The grooves provide flow channels through which water is supplied to the interface between the electrodes and the membranes. In a manner similar to providing a series of grooves in the surfaces of the electrodes, shallow, enclosed spaces are formed between the membranes and the adjacent surfaces of the electrodes. Openings are provided in communication with the recesses so that water can be introduced into the shallow spaces between the membranes and the surfaces of the electrodes. The shallow spaces between surfaces of the electrodes and the solid polymer membranes are preferably no deeper than from about 5 mm to about 10 mm so that effective conduction of current will be maintained between the electrodes and the solid polymer membranes. The shallow spaces can be formed by situating a spacer between the electrodes, such as around the periphery thereof, and the membrane, or recesses can be formed in the surfaces of the electrodes so that the periphery of the electrodes contacts the abutting membranes.

The efficiency of the process of this invention using lead dioxide anodes is substantially equivalent to processes wherein conventional metal anodes, such as nickel anodes, are used. The efficiency is not as high as in processes using precious metal anodes; however, the cost of lead dioxide anodes is many times smaller than precious metal anodes and even substantially less than nickel anodes.

Many of the conventional base metal anodes, such as iron and mild steel anodes, cannot be used with acidic electrolytes because of the excessive corrosion which occurs with such anodes. The lead dioxide anodes of the present invention can be employed with insignificant corrosion in either acidic or alkaline electrolytes.

Whereas, this invention is here illustrated and described with respect to particular embodiments which are contemplated as illustrating the best mode of carrying out the invention, it is to be understood that changes may be made therein and other embodiments constructed without departing from the novel inventive concepts set forth herein and in the claims that follow.

I claim:

1. A method for electrolysis of a liquid consisting essentially of water to produce hydrogen and oxygen therefrom, said method comprising positioning a solid polymer electrolyte membrane between an anode comprising lead dioxide and a cathode, said anode and cathode contacting mutually opposite sides of said membrane; wetting with water the surfaces of the anode and cathode which abut said membrane; and passing a current through said membrane from the anode to the cathode to generate hydrogen gas at the cathode and oxygen gas at the anode.

2. A method in accordance with claim 1, wherein the anode is formed in a porous state and water is passed through the anode to wet the respective surface thereof which is in contact with said membrane.

3. A method in accordance with claim 1, wherein the anode is formed with grooves in the respective surface thereof which abuts said membrane and water is passed through said grooves to wet said respective surface of the anode.

4. A method in accordance with claim 1, wherein the cathode is made of an inert metal.

5. A method in accordance with claim 1, wherein the surface of the anode which abuts the solid polymer electrolyte membrane has a shallow recess therein so that the periphery of the anode contacts said membrane and a shallow, enclosed space is formed between said membrane and the recessed portion of the anode, and water is introduced into said space as the electric current passes from the anode to the cathode.

6. A method in accordance with claim 1, wherein a spacer is provided around the periphery of the anode between the anode and the solid polymer electrolyte membrane so that a shallow enclosed space is formed between said membrane and the adjacent surface of the anode, and water is introduced into said space as the electric current passes from the anode to the cathode.

* * * * *